United States Patent
Heuze et al.

(10) Patent No.: US 7,946,324 B2
(45) Date of Patent: May 24, 2011

(54) RUN FLAT DEVICE FOR A MOTOR VEHICLE, AND A WHEEL ASSEMBLY INCORPORATING IT

(75) Inventors: Olivier Heuze, L'Isle Adam (FR); Florence Ratet, Parmain (FR)

(73) Assignee: Hutchinson, Paris (FR)

( * ) Notice: Subject to any disclaimer, the term of this patent is extended or adjusted under 35 U.S.C. 154(b) by 753 days.

(21) Appl. No.: 11/984,384

(22) Filed: Nov. 16, 2007

(65) Prior Publication Data

US 2008/0149247 A1    Jun. 26, 2008

Related U.S. Application Data

(63) Continuation of application No. 11/896,966, filed on Sep. 7, 2007.

(30) Foreign Application Priority Data

Sep. 12, 2006  (FR) ...................... 06 07954

(51) Int. Cl.
*B60C 17/00* (2006.01)
*B60C 17/04* (2006.01)
*B60C 19/00* (2006.01)
*B60C 5/00* (2006.01)

(52) U.S. Cl. ........ 152/152; 152/155; 152/157; 152/516; 152/520

(58) Field of Classification Search .................. 152/152, 152/157, 155, 516, 520
See application file for complete search history.

(56) References Cited

U.S. PATENT DOCUMENTS

| 5,012,849 | A | 5/1991 | Ko | |
| 2005/0056355 | A1* | 3/2005 | Tavin et al. | 152/158 |

FOREIGN PATENT DOCUMENTS

| EP | 226967 | * | 7/1987 |
| EP | 1514703 | | 3/2005 |
| EP | 1522427 | | 4/2005 |
| EP | 1541384 | | 6/2005 |
| GB | 2015439 | * | 9/1979 |
| GB | 2417225 | | 2/2006 |
| JP | 54-59702 | | 5/1979 |
| JP | 6-344733 | | 12/1994 |

* cited by examiner

*Primary Examiner* — Justin Fischer
(74) *Attorney, Agent, or Firm* — Clark & Brody

(57) ABSTRACT

The present invention relates to a run flat device for fitting to a tubeless wheel assembly for a motor vehicle, and to such a wheel assembly incorporating the device.

A device of the invention comprises:
  an annular cover support structure subdivided into at least two ring sectors that are circumferentially juxtaposed; and
  locking means for locking the beads against the flanges to connect the support structure to the beads.

According to the invention, the sectors are interconnected by connection means comprising a male member secured to one of the circumferential ends of each sector and removably mounted in a female member formed in the facing end of the adjacent sector, the male member comprising a projection that is terminated by an anchor tab, the female member being formed by a slot having a radially-lower zone and a radially-upper zone of widths that are respectively greater than and less the width of the tab, the upper zone being adapted to receive said projection axially locked in a position for anchoring the tab.

9 Claims, 7 Drawing Sheets

RUN FLAT DEVICE FOR A MOTOR VEHICLE, AND A WHEEL ASSEMBLY INCORPORATING IT

This application is a continuation of U.S. Ser. No. 11/896, 966, filed Sep. 7, 2007.

The present invention relates to a run flat device for fitting to a tubeless wheel assembly for a motor vehicle, and to such an assembly incorporating the device, the device enabling a long distance to be traveled at relatively high speed even when the wheel assembly is partially or totally deflated. The run flat device is usable in particular for fitting to a military vehicle for running over all types of ground, including sandy ground.

BACKGROUND OF THE INVENTION

Known run flat devices are generally constituted by a support ring mounted with clearance around a wheel rim inside a tire cover. The ring is made of flexible material and comprises a single piece, and because of its width at its base it exerts a force that presses the tire cover against the rim. Use is sometimes made of rigid devices made up of a plurality of sectors that are fastened together in pairs.

Document EP-A-1 541 384 in the name of the Applicant presents a run flat device for a wheel assembly comprising a rim made up of a plurality of blocks, having a support ring for mounting around the rim and subdivided into at least two ring sectors, and means for locking the beads of the cover against the flanges of the rim for connecting the ring sectors to said beads in order to ensure that the wheel assembly can deliver drive in the event of pressure therein being reduced.

OBJECTS AND SUMMARY OF THE INVENTION

An object of the present invention is to provide a run flat device for fitting to a tubeless wheel assembly for a motor vehicle, the assembly comprising a wheel rim made up of a plurality of blocks and a tire cover having beads mounted against flanges of said rim, said device comprising:
- an annular support structure for mounting around said wheel rim in order to support said cover, after a drop in the inflation pressure inside said wheel assembly, and subdivided into at least two ring sectors adapted to form said structure by being juxtaposed in the circumferential direction thereof; and
- locking means for locking said beads against said flanges in order to connect said annular support structure to said beads;

which device enables the axial flexibility of known run flat devices to be improved, in particular in the event of lateral impacts being applied to the wheel assembly.

To this end, a device of the invention is such that each ring sector has at least two rigid support elements that are superposed in the radial direction of the structure and that are mutually separated in pairs by a rubber-based resilient layer, which resilient layer is adapted, by shearing in the even of a lateral force being applied to the structure, to enable the radially outer support element to move axially relative to the radially inner support element.

It should be observed that none of the superposed support elements radially separated by the resilient layer penetrates into the resilient layer (i.e. none is anchored therein). Thus, in the present invention, the entire radially outer support element is located radially outside the radially outer face of the resilient layer.

According to another characteristic of the invention, said or each resilient layer may extend over substantially the entire axial width of said support elements that it separates radially.

In an embodiment of the invention, said or each resilient layer is constituted by a rubber composition.

In another embodiment of the invention, said or each resilient layer is constituted by a composite of rubber and metal reinforcement. In which case, said reinforcement may comprise at least one cylindrically arcuate metal sheet that is substantially parallel to the radially inner and outer faces of said or each resilient layer.

According to another characteristic of the invention, said locking means may comprise at least one pair of annular wedges, each based on rubber reinforced by a circumferential reinforcing element and serving respectively to be mounted in contact with two side faces of said support structure.

Advantageously, each of said wedges may be formed as a single piece having a bearing face that is pressed against a radially inner bearing zone of one of said side faces of said support structure. Preferably, each of said wedges presents an axial section that is substantially trapezoidal in shape with its short and long bases respectively defining the radially inner and the radially outer faces of said locking means.

According to another characteristic of the invention, each of the two rigid support elements situated on either side of said resilient layer may present a respective wall having a radially outer face or a radially inner face that extends axially from one side edge to the other of said resilient layer.

Advantageously, at least one of said rigid support elements may present a wall having radially inner and outer faces interconnected by a radial connecting portion so as to confer a substantially I-shaped axial section to said wall.

In a first embodiment of the invention, said rigid support elements each presents, or independently of the other, a wall of axial section that is substantially rectangular or trapezoidal defining one or more internal compartments.

In this first embodiment, the wall of each radially outer or inner support element within said structure may advantageously present at least one radial stiffener partition interconnecting the radially inner and outer faces of said support element. It should be observed that this radial partition serves to improve the compression strength of the device of the invention when running flat or when running at low inflation pressure.

Also in this first embodiment, the wall of each radially inner support element within said structure may advantageously present a radially inner base that is substantially in the shape of an isosceles trapezoid, having its two non-parallel sides extending towards each other on going radially outwards from the radially inner face of said support element.

These two non-parallel sides of said base may:
- with a multiblock rim having a substantially flat rim band, form bearing zones for each side face of said support structure, said wedges of axial section of substantially trapezoidal shape being pressed respectively against said bearing zone; or else
- with a multiblock rim having a circumferential recess with side edges both forming undercuts, be adapted to cooperate with said side edges, said wedges pressing radially outside said base.

According to another characteristic of the invention, said support section may terminate radially outwards in a protective portion based on rubber that surmounts the radially outer rigid support element and that projects axially beyond both of the side faces of said structure, covering said faces in part.

This protective portion may advantageously be made of a rigid rubber, or else of a composite of flexible rubber and reinforcing elements.

It should be observed that this rubber protective portion serves, by means of its profile, not only to protect the radially outer face of the annular support structure, but also to protect part of each of the two side faces of said structure. It should also be observed that this protective portion also serves to protect the tire cover when running in the inflated state, e.g. in the event of an impact, with the device coming into contact with the walls or the circumference of the cover.

According to another characteristic of the invention, the radially inner face of the wall of said support structure may be held captive in the rim via said flat-bottomed base received between the undercut side edges of said rim recess, or else via an asymmetrical anchor tab that extends the bottom of the base radially inwards and that is adapted to be anchored in a groove formed between said two rim blocks.

According to another characteristic of the invention, said ring sectors may be advantageously interconnected in pairs in the circumferential direction by connection means comprising a male member secured to one of the circumferential ends of each sector and removably mounted in a female member that is formed in the facing circumferential end of the adjacent sector in such a manner that the axial offset between said sectors is minimized in the event of a lateral force being applied to said structure.

When the rim has a flat bottom (i.e. no recess in the rim), it should be observed that such connection means enable a fraction of the forces to be taken up, thereby combating the "centrifugal" phenomenon due to the centrifugal effect when running in the inflated state (i.e. by optimizing the radial wedging of the ring sectors).

Advantageously, said male member comprises a projecting stem terminated by an axial anchor tab, and said female member is constituted by a slot having a radially lower zone of axial width greater than the axial width of the tab and adapted to engage the tab, and a radially upper zone of axial width less than that of said tab and adapted to receive said stem axially locked in a position for anchoring said tab, after the sector incorporating said tab has been raised relative to the sector incorporating said slot.

It should be observed that these connection means make it easy to mount said support sectors via reversible movement of the male member from said radially lower orifice to said radially upper orifice, which in operation receives said male member and prevents the sectors as connected together in this way from separating from one another.

Preferably, said rigid support elements and said connection means are based on a metal material such as aluminum, or titanium, or indeed based on a composite material possibly comprising a resin matrix (e.g. of epoxy) reinforced by glass or carbon reinforcing fibers.

It should be observed that using aluminum, or titanium or indeed such a composite material, serves to further reduce the weight of run flat devices of the invention.

A tubeless wheel assembly of the invention for a motor vehicle comprises a wheel rim made up of a plurality of blocks, a tire cover having beads mounted against axially inner and outer flanges respectively of said rim, and a run flat device mounted around said rim between said flanges, and said wheel assembly is such that said device is as defined above in the context of the present invention.

In a preferred first embodiment of the invention, said rim has a substantially flat rim bottom and said device is then such that the wall of each radially inner support element within said structure presents said base of substantially isosceles trapezoid shape (with its two non-parallel sides extending towards each other in a radially outer direction from the radially inner face of said support element, these two sides forming bearing zones for each side face of the support structure), said wedges being pressed respectively against said bearing zones.

In this first embodiment, said locking means comprise advantageously a pair of annular wedges of substantially trapezoidal section, each based on rubber reinforced by a circumferential reinforcing element, and mounted respectively against the two side faces of said support structure substantially level with the radially inner face thereof.

In this preferred first embodiment of the invention, it should be observed that the axial flexibility of the run flat device mounted around said rim having a substantially flat rim bottom is due essentially to the combination of the reinforced wedges of the trapezoidal belt type together with said rubber-based resilient layer separating the rigid support elements from each other.

In a second embodiment of the invention, said rim presents a flat-bottomed circumference recess defined axially by two undercut side edges, and said device is such that the two non-parallel sides of said base co-operate with said side edges, said wedges pressing radially outside the base.

In this second embodiment, it should be observed that the axial flexibility of the run flat device that is mounted around said circumferential hollow rim is due solely to said resilient layer based on rubber.

BRIEF DESCRIPTION OF THE DRAWINGS

Other characteristics, advantages, and details of the present invention appear on reading the following description of a plurality of embodiments of the invention given by way of non-limiting illustration, said description being made with reference to the accompanying drawings, in which.

MORE DETAILED DESCRIPTION

In the present description, the terms "axially inner" and "axially outer" refer respectively to the sides of the wheel rim that are to face towards the inside and towards the outside of the motor vehicle, once a wheel assembly including the rim has been mounted on a vehicle.

Figure 2:
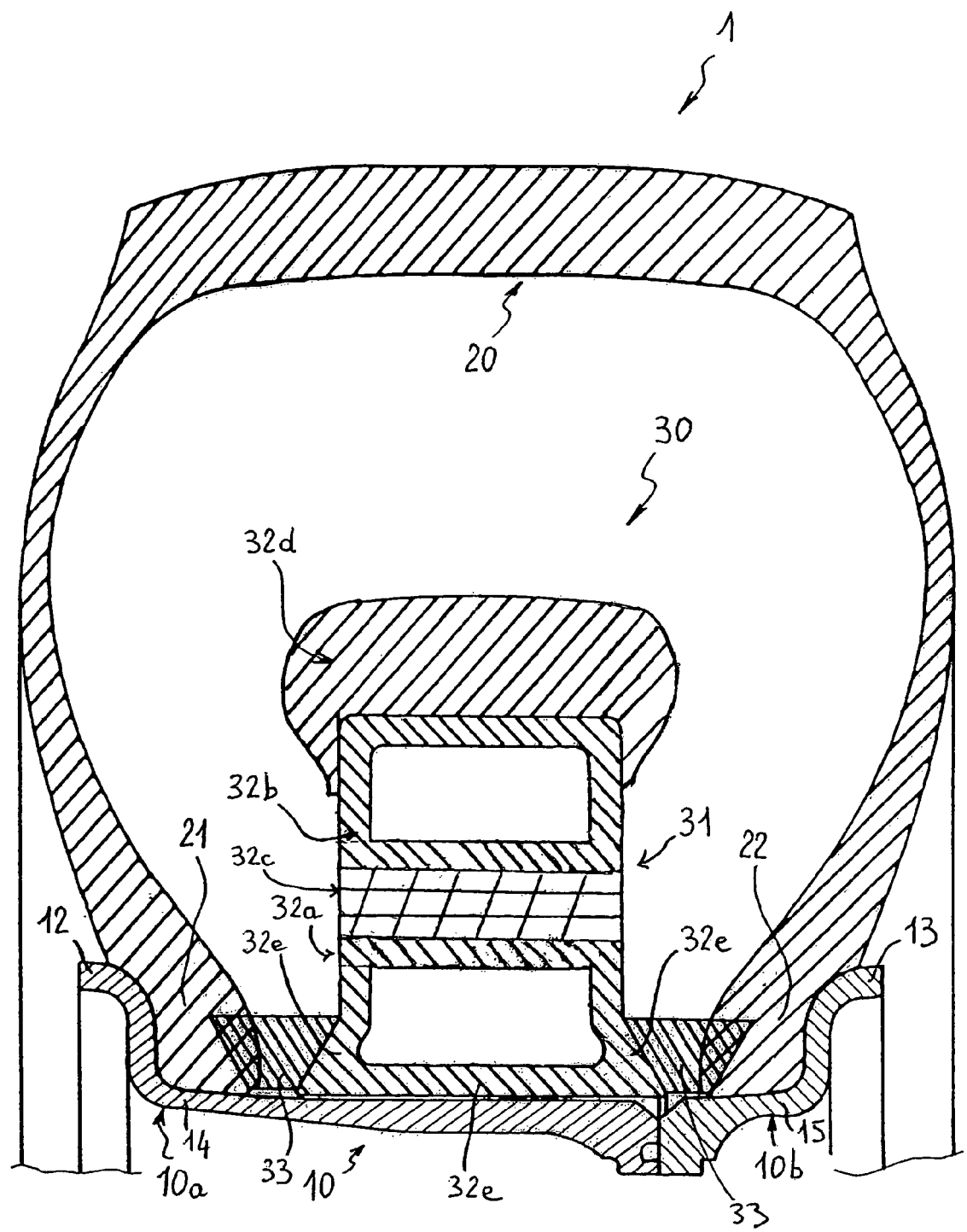
FIG. 2 is an axial half-section view of a wheel assembly incorporating a run flat device of the invention, corresponding to a variant embodiment of FIG. 1.
Figure 3:
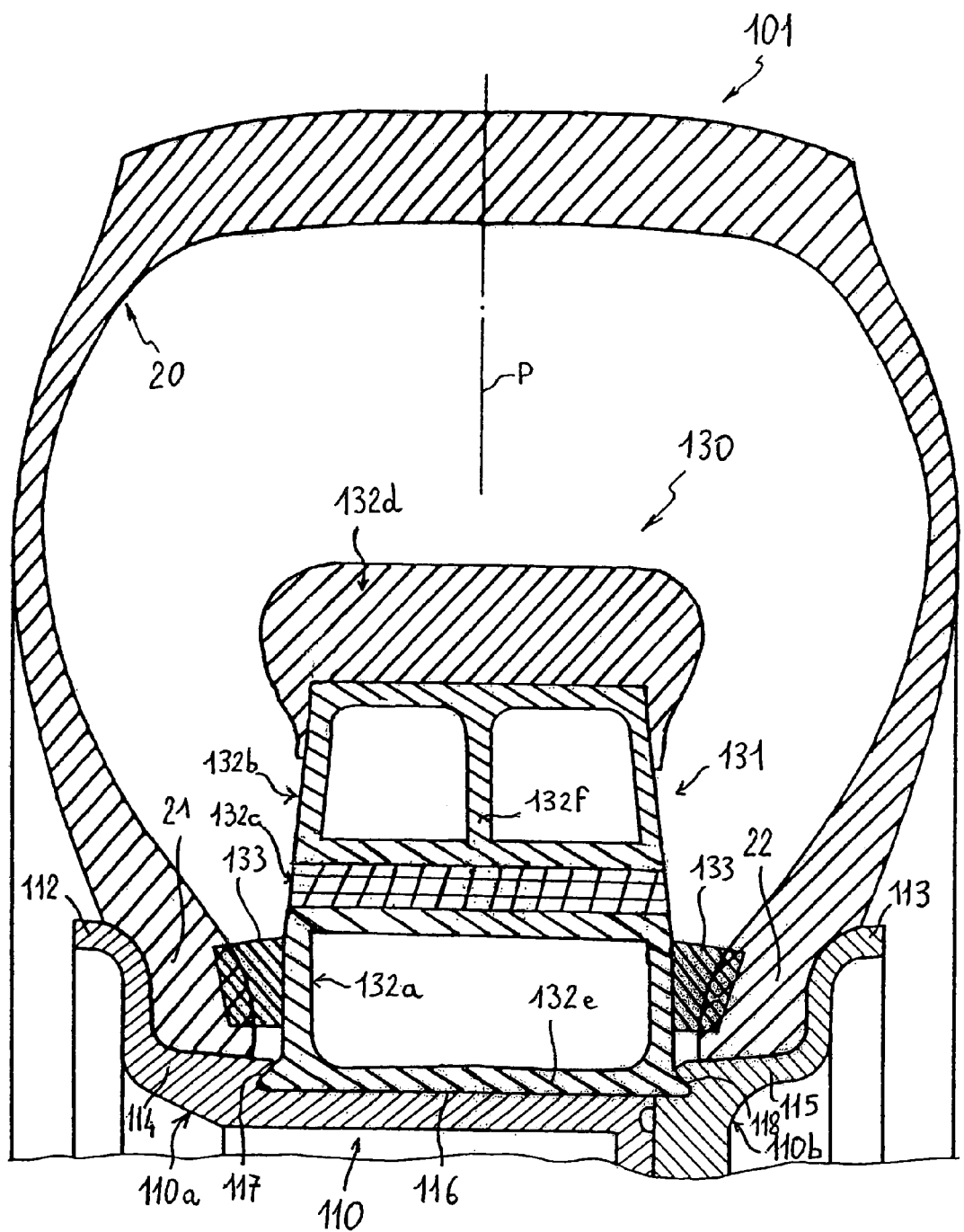
FIG. 3 is an axial half-section view of a wheel assembly incorporating another run flat device of the invention, corresponding to another embodiment of the invention.

The wheel assembly 1, 101 of the invention as shown in FIGS. 2 and 3 comprises a wheel rim 10, 110 having two blocks 10a & 10b, 110a & 110b secured to each other by fastener means (not shown) of the bolt type.

The two blocks 10a & 10b, 110a & 110b have respective axially inner and outer flanges 12 & 13, 112 & 113 respectively defining two rim seats 14 & 15, 114 & 115 extending axially from the flanges 12 & 13, 112 & 113, a tire cover 20 having beads 21 and 22 mounted to bear against the seats 14 & 15, 114 & 115 against the flanges 12 & 13, 112 & 113, and a run flat device 30, 130 mounted around the rim 10, 110 inside the cover 20 for the purpose of supporting the cover in the event of a drop in the inflation pressure inside the wheel assembly 1, 101.

In the example of FIG. 2, the run flat device 30 in the preferred first embodiment of the invention is mounted on a rim band 10 of the substantially flat type. The device 30 comprises:

an annular support structure 31 for mounting on the rim 10 in order to support the cover 20 after the inflation pressure inside the wheel assembly 1 has dropped, and that is subdivided into ring sectors that are interconnected and that are adapted to form the structure 31 by being juxtaposed in the circumferential direction thereof; and locking means 33 for locking the beads 21 & 22 against the flanges 12 & 13 in order to connect the structure 31 to the beads 21 & 22 and constituted by a pair of one-piece annular wedges based on rubber reinforced by a circumferential reinforcing element (not shown), these wedges 33 being made to bear laterally against the sectors 32 when the device 30 is mounted on the rim 10.

Figure 1:
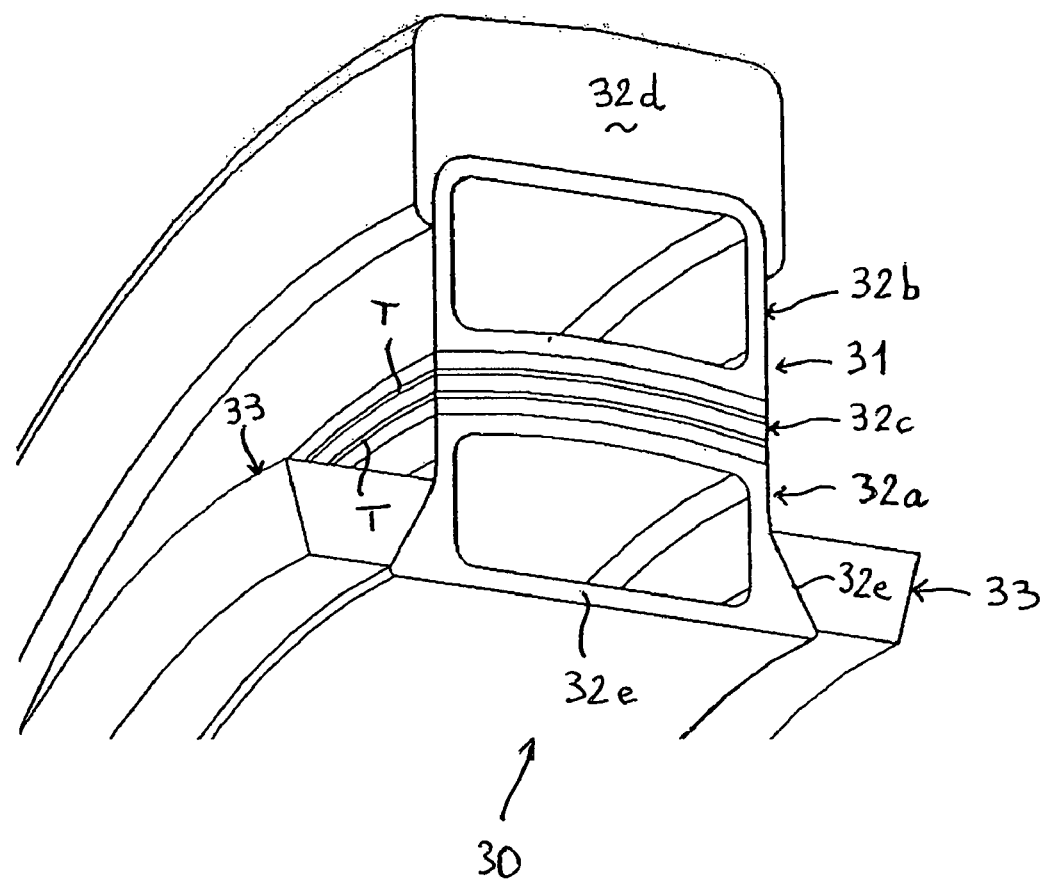
FIG. 1 is a fragmentary diagrammatic view in perspective of a run flat device in an embodiment of the invention.

More precisely, in the embodiment of FIGS. 1 and 2, each ring sector 32 comprises:

two rigid support elements 32a & 32b made of metal, e.g. of aluminum, that are superposed in the radial direction of the structure 31 and separated from each other by a resilient layer 32c based on rubber that extends over the entire axial width of the elements 32a & 32b, which elements present a wall of axial section that is substantially rectangular; and a protective portion 32d of rubber that surmounts the radially outer support element 32b radially and that projects axially beyond both side faces of said element 33b, partial overlying said faces.

This resilient layer 32c may be made exclusively from a rubber composition (see FIG. 2), or else, in a variant, may be made of a composite of rubber and metal reinforcement. With the composite construction, as shown in FIG. 1, the reinforcement advantageously comprises a plurality of metal sheets T of cylindrically arcuate shapes that extend substantially parallel to the radially and inner faces of the resilient layer 32c.

In the examples of FIGS. 1 to 3, the protective portion 32d is constituted by a rubber of rigid type. Nevertheless, it should be observed that in a variant it could be constituted by a composite comprising flexible rubber and reinforcing elements.

As can be seen in FIGS. 1 and 2, the radially inner rigid support element 32a presents a radially inner base 32e that is substantially in the form of an isosceles trapezoid, having side faces formed by the two non-parallel sides of the trapezoid extending towards each other on going radially outwards from the radially inner face of said element 32a. As can be seen in FIG. 2, the trapezoidal wedges 33 are pressed respectively against these side faces of the base 32e in such a manner that the respective inside faces of the elements 32a and the wedges 33 are substantially at the same level, being mounted on the rim band 10.

FIG. 3 shows a run flat device 130 constituting a second embodiment of the invention. This device 130 is mounted on a rim band 110 of the type having a circumferential recess 116 that is defined by axially inner and outer side edges 117 & 118 both forming undercuts and extending the rim seats 114 & 115. More precisely, it can be seen that edges 117 & 118 of the recess 116 are symmetrical about the circumferential midplane P of the device 130. The rim band 116 is adapted to receive in abutment a radially inner portion forming a base 132e of each ring sector 132 of the structure 131.

As shown in FIG. 3, this base 132e presents a radial height that corresponds substantially to the thickness of the wall of each sector 132 and that is thus smaller than the radial height of the base 32e of the device 30 shown in FIG. 2.

This device 130 in the second embodiment of the invention also differs from the device of FIG. 2 essentially, wherein:

the radially outer rigid support element 132b of each sector 132 presents an outer wall of substantially trapezoidal section, with its side faces extending radially outwards and towards each other in this example and having radially inner and outer faces interconnected by a radial stiffener partition 132f centered on the plane P, and wherein the locking means 133 are constituted by a pair of annular wedges made of rubber that can be constituted by respective single pieces or else subdivided into a plurality of ring sectors (in which case the wedges 133 are respectively based on non-reinforced rubber and are adhesively bonded to the structure 131).

Figure 4:
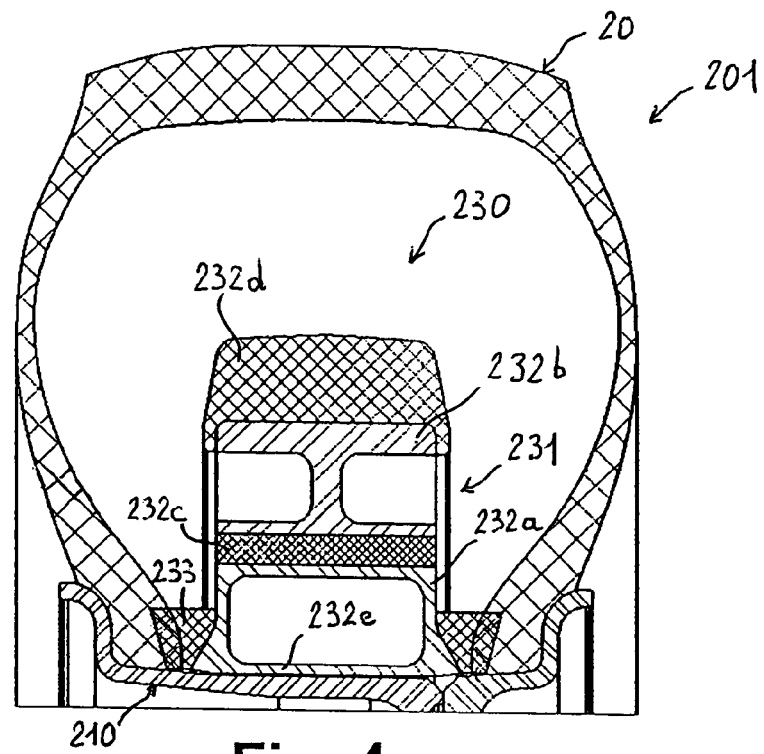
FIGS. 4, 5, and 6 are three axial half-section views of wheel assemblies incorporating respective run flat devices constituting three other embodiments of the invention.

The run flat device 230 of FIG. 4 differs from that of FIG. 2 essentially, wherein each radially outer rigid support element 232b of the support structure 231 is of I-shape with long flanges. As shown in FIG. 4, the element 232b of each ring sector is thus made up of two horizontal bases extending substantially over the entire axial width of the structure 231 and interconnected by a radial web portion that is axially in the middle. In this FIG. 4 embodiment, the base 232e of each radially inner support element 232a is mounted on a flat band rim 210 to produce the wheel assembly 201, unlike the rim 110 of FIG. 3 which presents the recess 116 in its rim.

Figure 5:
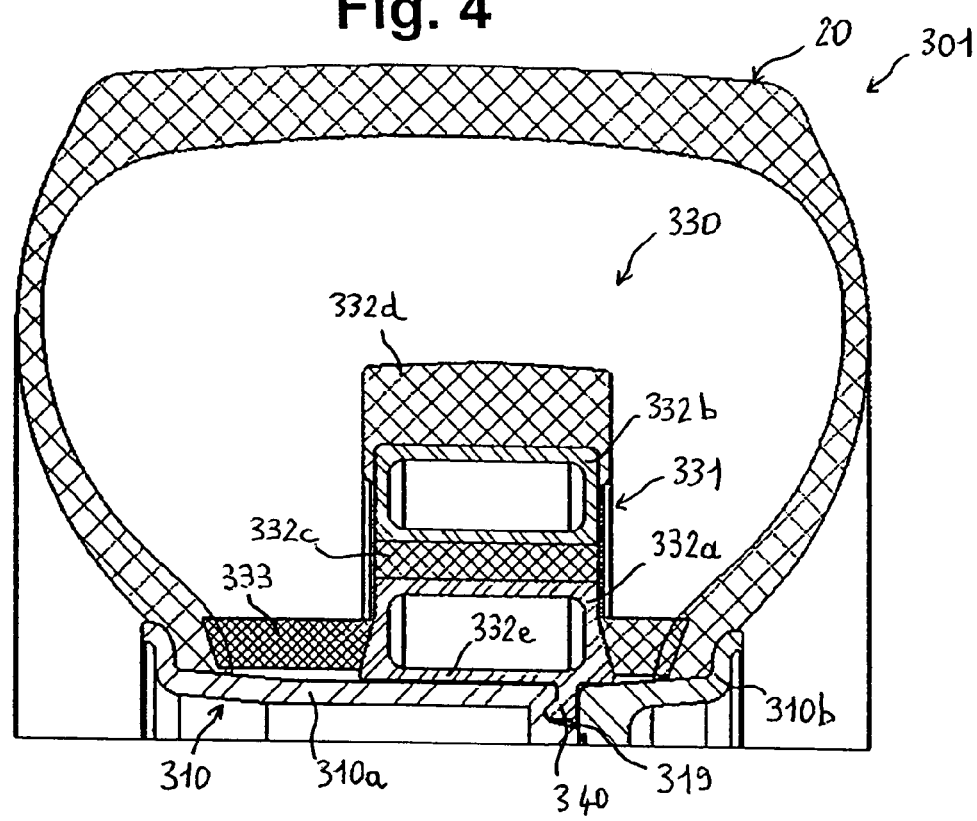

The run flat device 330 of FIG. 5 differs from that of FIG. 3 essentially, wherein each radially inner support element 332a is provided with an asymmetrical anchor tab 340 that extends the bottom of the base 332e of said element 332a radially inwards and that is adapted to be anchored in a groove formed between the two blocks 310a & 310b of the rim 310, in order to constitute the wheel assembly 301.

Figure 6:
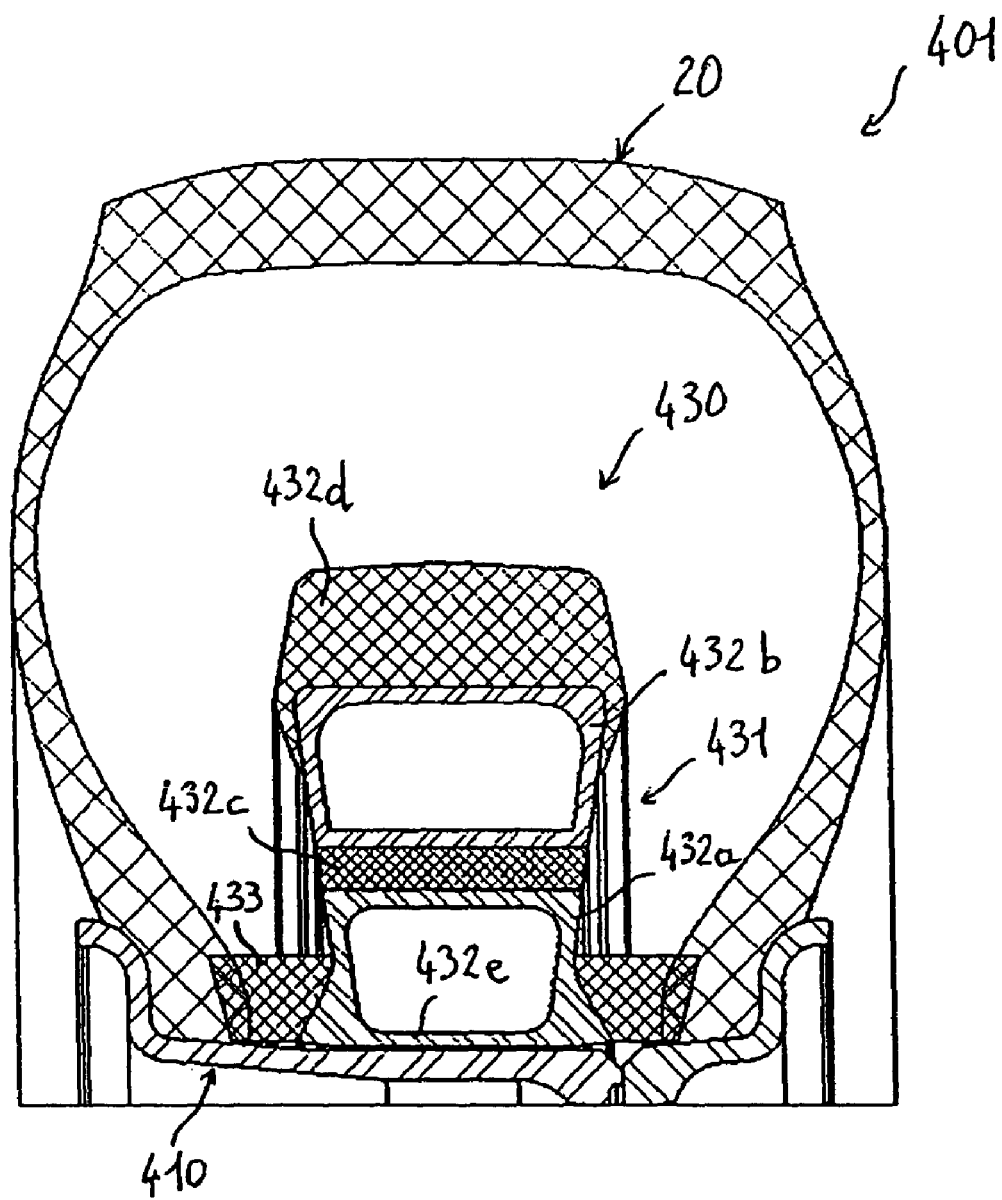

The run flat device 430 of FIG. 6 differs from that of FIG. 2 essentially, wherein the radially inner support element 432a and the radially outer support element 432b both present respective walls of isosceles trapezoid shape, with the short bases thereof defining the radially inner faces of the corresponding elements 432a & 432b. As shown in the example of FIG. 6, these trapezoidal elements 432a and 432b thus present side faces that extend each other mutually, such that the radially inner face of each element 432a defines a minimum axial width for the support structure 431, while the radially outer face of each element 432b defines a maximum axial width for the structure 431.

It should be observed that this support structure 431 of trapezoidal shape with small and large bases situated respectively radially on the inside and radially on the outside is particularly well adapted for mounting on a rim 410 of narrow width, then making it possible to spread the pressure exerted on the cover 20 by the device 130 when running flat over a greater area of the cover 20, thereby contributing to providing the cover 20 with better protection.

Figure 7:
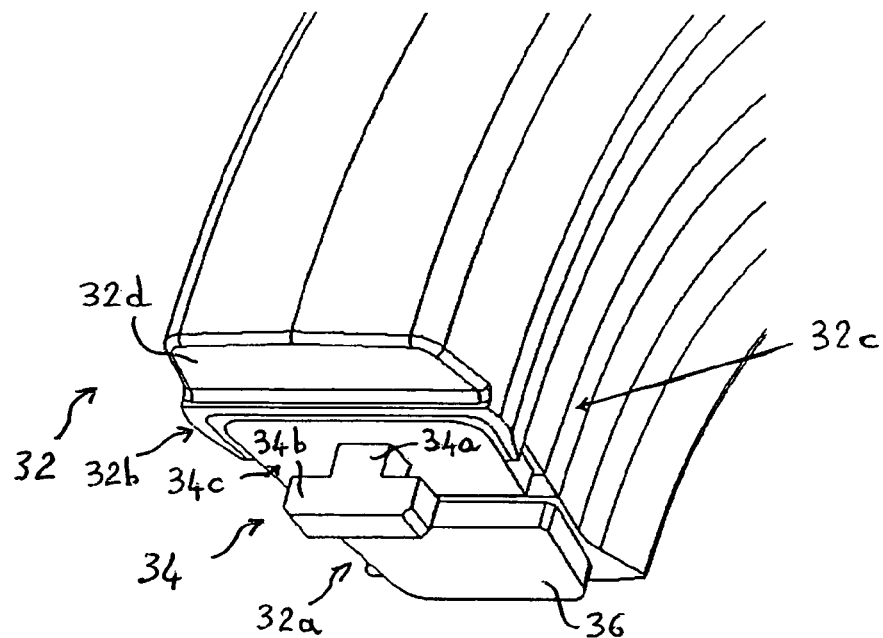
FIGS. 7 and 8 are fragmentary perspective views showing two male and female connection members as provided at the two circumferential ends of a ring sector of a run flat device as shown in FIGS. 1 and 2.
Figure 8:
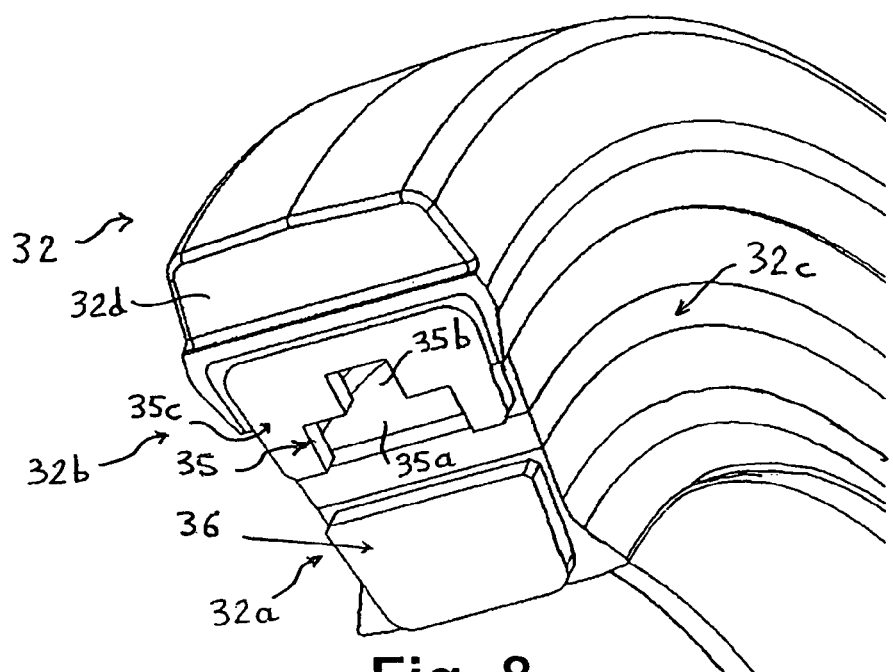

FIGS. 7 and 8 show respectively a male connection member 34 and a female connection member 35 as provided at respective ends of each ring sector 32 of the annual structure 31 of FIGS. 1 and 2, the male element 34 of one sector being adapted to be anchored inside the female member 35 of an adjacent sector 32.

Figure 9:
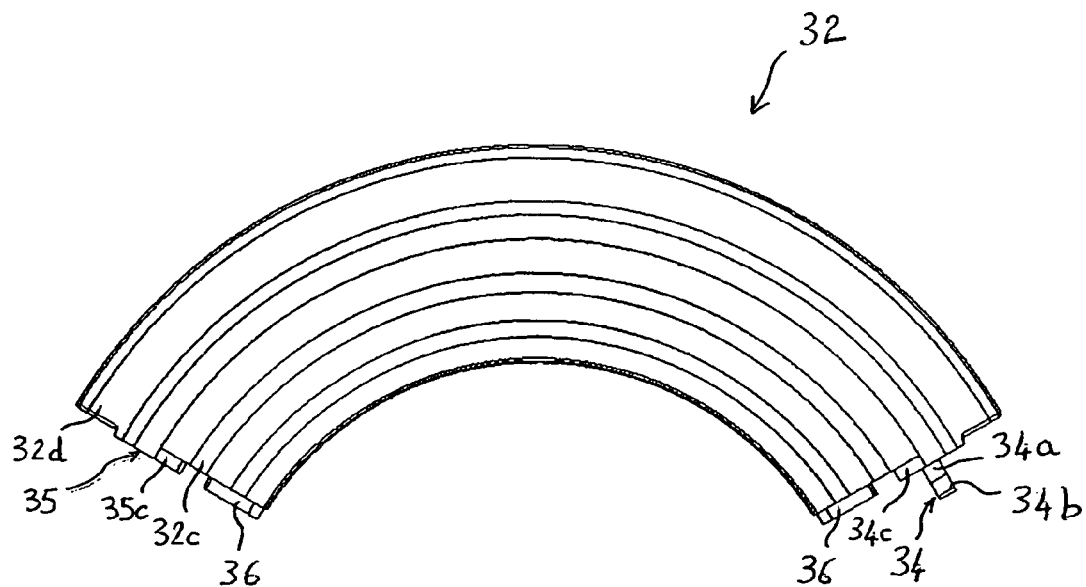
FIG. 9 is a side view of a ring sector as shown in FIGS. 7 and 8, thus incorporating said male and female members at its respective ends.

As shown in FIG. 7, the male member 34 is then constituted by a projecting T-shape having a stem 34a that is terminated by an axial anchor tab 34b and that is secured to a metal male support plate 34c, itself secured to one of the two circumferential ends (see FIG. 9) of the radially outer rigid support element 32b of the sector 32, e.g. by welding. This support plate 34c extends over substantially the entire axial width and radial height of said support element 32b, radially above the resilient layer 32c and beneath the protective portion 32d.

The female member 35 is formed by a slot having two zones 35a and 35b formed in an axial plane in a metal female support plate 35c which is secured to the other circumferential end (see FIG. 9) of the same radially outer rigid support element 32b, e.g. by welding. This support plate 35c extends over substantially the entire axial width and radial height of the support element 32b (except for the slot 35), radially above the resilient layer 32c and beneath the protective portion 32d.

In this embodiment, the slot 35 comprises:
a radially inner zone 35a of axial width greater than that of the anchor tab 34b and adapted to be engaged therein, said bottom zone 35a forming the rectangular inlet to a circumferentially arcuate cavity formed in the element 32b; and
a radially upper zone 35b of axial width smaller than that of the tab 34b and adapted to receive the stem 34a so that it is locked axially and radially in a position for anchoring the tab 34a after the sector incorporating the tab has been raised relative to the sector incorporating the slot 35, said upper zone 35b also forming the rectangular inlet of a circumferentially arcuate cavity and extending radially towards the top of the zone 35a over an axial width that is considerably smaller.

As shown in FIG. 8, the slot in the female member 35 thus presents an upside-down T-shape, for anchoring the tab 34 by means of its stem 34a passing in the engaged position from the zone 35a to the zone 35b.

Furthermore, each circumferential end of a sector 32 may also optionally be provided with a lower reinforcing plate 36 that is secured (e.g. by welding) to the radially inner rigid support element 32a that is radially beneath the resilient layer 32c, and thus of the corresponding male or female support plate 34c or 35c.

It should be observed that the assembly formed by the male or female support plate 34c, 35c and by the lower reinforcing plate 36 serves to conserve the effect provided by the resilient layer 32c because the two plates 34c or 35c and 36 are formed radially on either side of said layer 32c, for each sector 32.

Figure 10:
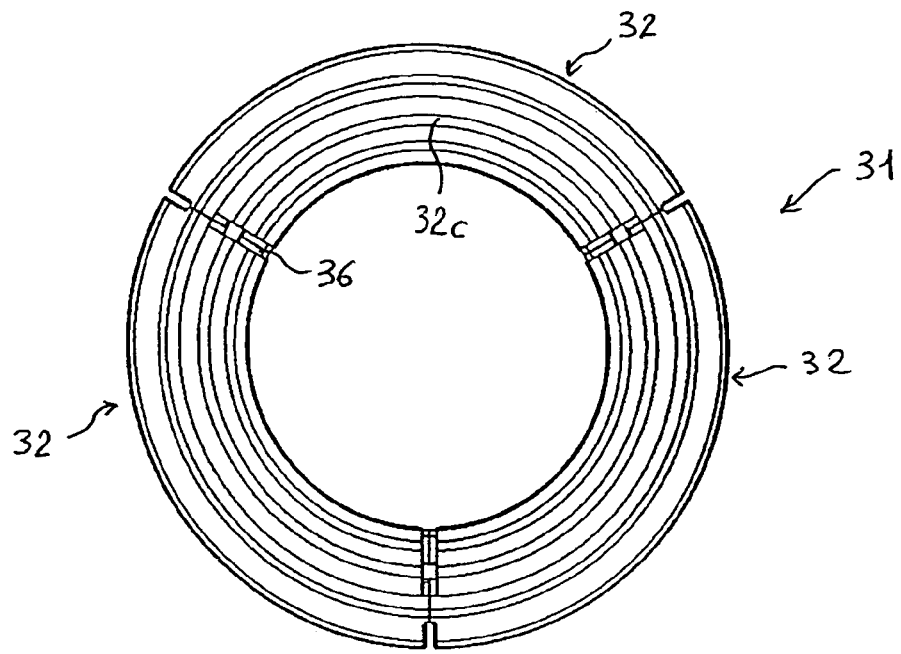
FIG. 10 is a side view of three FIG. 9 ring sectors forming an annular support structure included in the device of the invention as shown in FIGS. 1 and 2.

As shown in FIG. 10, the annular support structure 31 is assembled by engaging the male member 34 of one circumferential end of each sector 32 in the female member 35 in the facing circumferential end of the adjacent sector 32 by performing the above-mentioned radial lifting of the anchor tab 34b inside the slot 35 in order to lock it axially and radially. It should be observed that the movement of each anchor tab 34b in the corresponding slot 35 is reversible in order to separate the sectors 32 for the purpose of dismantling the annular structure 31.

In general, for all of the embodiments mentioned above, it should be observed that the resilient layer 32c to 432c of the annular structure 31 to 431 serves, by means of shearing in the event of a lateral force or impact, to allow the radially outer support element 32b to 432b within each sector 132 to move axially a little relative to the inner radial support element 32a to 432a, and that the connection means 34, 35 serve firstly to minimize the mutual axial displacement of the ring sectors 132 and also to share forces over adjacent ring sectors in the event of a lateral impact against an end of a sector 132.

What is claimed is:

1. A run flat device for fitting to a tubeless wheel assembly for a motor vehicle, the assembly comprising a wheel rim made up of a plurality of blocks and a tire cover having beads mounted against flanges of said rim, said device comprising:
an annular support structure for mounting around the wheel rim in order to support said cover after a drop in the inflation pressure inside the wheel assembly, and subdivided into at least two ring sectors forming said annular structure when circumferentially arranged end to end, each ring sector being in the shape of an arc of a circle; and
locking means for locking said beads against said flanges in order to connect said annular support structure to said beads;
wherein said ring sectors are interconnected in pairs in the circumferential direction by connection means comprising a male member secured to one of the circumferential ends of each sector and removably mounted in a female member that is formed in the facing circumferential end of the adjacent sector in such a manner that the axial offset between said sectors is minimized in the event of a lateral force being applied to said structure,
said male member comprising a projection terminated by an anchor tab,
said female member being constituted by a slot having
a radially lower zone of axial width greater than the axial width of the tab and adapted to have the tab pushed therein, and
a radially upper zone of axial width less than that of said tab and adapted to receive said projection axially locked in a position for anchoring said tab, after the sector incorporating said tab has been raised relative to the sector incorporating said slot.

2. A run flat device according to claim 1, wherein said projection is formed on a male support plate at one of the circumferential ends of each sector, and wherein said slot is formed on a female support plate at the other circumferential end of each sector.

3. A run flat device according to claim 1, wherein said projection is formed by a stem, and wherein said tab is an axial anchor tab, such that said male member presents a T-shape.

4. A run flat device according to claim 1, wherein said locking means comprise at least one pair of annular wedges, each based on rubber reinforced by a circumferential reinforcing element and serving respectively to be mounted in contact with two side faces of said support structure.

5. A run flat device according to claim 4, wherein each of said wedges is formed as a single piece, having a bearing face that is pressed against a radially inner bearing zone of one of said side faces of said support structure.

6. A run flat device according to claim 5, wherein each of said wedges presents an axial section that is substantially trapezoidal in shape with its short and long bases respectively defining the radially inner and the radially outer faces of said locking means.

7. A tubeless wheel assembly for a motor vehicle, the assembly comprising a wheel rim comprising a plurality blocks, a tire cover having beads mounted respectively against axially inner and outer flanges of said rim, and a run flat device mounted around said rim between said flanges, wherein said device is as defined in claim 1.

8. A wheel assembly according to claim 7, wherein said rim has a substantially flat rim band.

9. A wheel assembly according to claim 7, wherein said rim presents a flat-bottomed circumferential recess axially defined by two undercut side edges, that are designed to co-operate with a radially inner base in the form of an isosceles trapezoid presented by each sector.

* * * * *